United States Patent
Lee et al.

(10) Patent No.: US 10,178,574 B2
(45) Date of Patent: Jan. 8, 2019

(54) METHOD FOR REPORTING CHANNEL STATE AND DEVICE THEREFOR

(71) Applicant: LG ELECTRONICS INC., Seoul (KR)

(72) Inventors: Hyunho Lee, Seoul (KR); Hyungtae Kim, Seoul (KR); Kijun Kim, Seoul (KR); Hanjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 15/304,379

(22) PCT Filed: Apr. 30, 2015

(86) PCT No.: PCT/KR2015/004394
§ 371 (c)(1),
(2) Date: Oct. 14, 2016

(87) PCT Pub. No.: WO2015/167280
PCT Pub. Date: Nov. 5, 2015

(65) Prior Publication Data
US 2017/0034731 A1 Feb. 2, 2017

Related U.S. Application Data

(60) Provisional application No. 61/987,494, filed on May 2, 2014.

(51) Int. Cl.
*H04W 24/10* (2009.01)
*H04L 5/00* (2006.01)
(Continued)

(52) U.S. Cl.
CPC .......... *H04W 24/10* (2013.01); *H04B 17/345* (2015.01); *H04L 5/00* (2013.01);
(Continued)

(58) Field of Classification Search
None
See application file for complete search history.

(56) References Cited

U.S. PATENT DOCUMENTS 9,844,005 B2* 12/2017 Ouchi ................... H04W 52/04
2011/0141987 A1* 6/2011 Nam ..................... H04L 1/0003
370/329

(Continued)

*Primary Examiner* — Bunjob Jaroenchonwanit
(74) *Attorney, Agent, or Firm* — Birch, Stewart, Kolasch & Birch, LLP

(57) ABSTRACT

A method for reporting a channel state in a wireless communication system is performed by a terminal and comprises the steps of: receiving a configuration with respect to a zero-power transfer resource for a channel state measurement, wherein the zero-power transmission resource corresponds to a portion of a cell-specific reference signal (CRS) resource element (RE) of a serving base station or a CRS RE of a main interference base station; determining whether the zero-power transfer resource is set in a subframe to which a reference resource for the channel state measurement belongs; if the zero-power transfer resource is set in the subframe to which the reference resource belongs, calculating a value of a first-type or second-type channel state in the zero-power transfer resource; and reporting the calculated value of the first-type or second-type channel state to the serving base station, wherein the value of the first-type or second-type channel state can be a value from which the influence of an interference signal from the main interference base station has been removed.

12 Claims, 8 Drawing Sheets

(51) Int. Cl.
  *H04B 17/345* (2015.01)
  *H04W 72/04* (2009.01)
  *H04W 52/24* (2009.01)
  *H04W 52/36* (2009.01)
  *H04W 52/40* (2009.01)

(52) U.S. Cl.
  CPC ......... *H04L 5/0048* (2013.01); *H04W 52/243* (2013.01); *H04W 72/044* (2013.01); *H04W 52/367* (2013.01); *H04W 52/40* (2013.01)

(56) References Cited

U.S. PATENT DOCUMENTS

| | | | | |
|---|---|---|---|---|
| 2011/0249643 A1* | 10/2011 | Barbieri | | H04L 1/0026 370/329 |
| 2013/0094595 A1* | 4/2013 | Dimou | | H04L 5/005 375/252 |
| 2013/0223332 A1* | 8/2013 | Wu | | H04L 5/0048 370/315 |
| 2013/0322350 A1* | 12/2013 | Gaur | | H04L 1/0013 370/329 |
| 2014/0003324 A1* | 1/2014 | Davydov | | H04W 4/06 370/312 |
| 2014/0044061 A1* | 2/2014 | Yue | | H04W 72/042 370/329 |
| 2014/0112253 A1 | 4/2014 | Nagata et al. | | |
| 2014/0321306 A1* | 10/2014 | Nam | | H04L 1/0003 370/252 |
| 2015/0092695 A1* | 4/2015 | Zhao | | H04W 24/00 370/329 |
| 2015/0264694 A1* | 9/2015 | Nagata | | H04L 25/0224 370/329 |
| 2015/0326324 A1* | 11/2015 | Lee | | H04B 15/00 370/328 |
| 2016/0301515 A1* | 10/2016 | Ouchi | | H04L 5/0057 |
| 2017/0034731 A1* | 2/2017 | Lee | | H04W 52/243 |

* cited by examiner

METHOD FOR REPORTING CHANNEL STATE AND DEVICE THEREFOR

TECHNICAL FIELD

The present invention relates to a wireless communication system, and more particularly, to a method of reporting an interference cancellation performance reflected channel state and apparatus therefor.

BACKGROUND ART

Various devices (e.g., smartphones, tablet PCs, etc.) and technologies requiring Machine-to-Machine (M2M) communications and high data throughputs continue to appear and tend to be popularized. And, a data amount necessary to be processed on a cellular network is increasing very fast. In order to meet the fast increasing data processing requirement amount, technologies (e.g., carrier aggregation technology, cognitive radio technology, etc.) for using more frequency bands efficiently and technologies (e.g., multi-antenna technology, multi-base station cooperation technology, etc.) for increasing data capacity transmitted within a limited frequency are developed. And, a communication environment is evolved in a direction of increasing density of nodes accessible by a nearby user equipment. A node means a fixed point capable of transmitting/receiving a radio signal to/from a user equipment by being equipped with at least one antenna. A communication system equipped with nodes of high density can provide a user equipment with a communication service of high performance by cooperation between the nodes.

According to the multi-node cooperative communication scheme of performing communication with a user equipment using the same time-frequency resource at a plurality of nodes, since each node operates as an independent base station, such a scheme has performance much better than that of an existing communication scheme of performing communication with a user equipment without mutual cooperation.

A multi-node system performs a cooperative communication using a plurality of nodes that operate as a base station (or, access point), an antenna, an antenna group, a radio remote header (RRH) and a radio remote unit (RRU). Unlike the existing center concentrated antenna system having antennas concentrated on a base station, a plurality of the nodes in the multi-node system are located in a manner of being spaced apart from each other over a predetermined interval. A plurality of the nodes can be operated by at least one base station or a base station controller configured to control an operation of each node or schedule data to be transmitted/received through each node. And, each of the nodes is connected to the base station or the base station controller configured to operate the corresponding node through a cable or a dedicated line.

Such a multi-node system may be regarded as a sort of MIMO (multiple input multiple output) system in that distributed nodes can communicate with single or multiple users by transmitting/receiving different streams simultaneously. Yet, since the multi-node system transmits a signal using the nodes distributed to various locations, a transmitting area supposed to be covered by each antenna is reduced in comparison with antennas provided to an existing centralized antenna system. Hence, compared to the existing system capable of implementing the MIMO technology in the centralized antenna system, the multi-node system can reduce a transmit power required for each antenna to transmit a signal. Moreover, since a transmitting distance between an antenna and a user equipment is reduced, a pathloss is reduced and a fast transmission of data is enabled. Hence, transmission capacity and power efficiency of a cellular system can be raised and a communication performance of a relatively uniform quality can be met irrespective of a location of a user equipment within a cell. In the multi-node system, since base station(s) or base station controller(s) connected to a plurality of nodes cooperates for data transmission/reception, a signal loss generated from a transmitting process is reduced. In case that nodes located by being spaced apart from each other over a predetermined distance perform cooperative communication with a user equipment, correlation and interference between antennas are reduced. Hence, according to the multi-node cooperative communication scheme, it is able to obtain a high SINR (signal to interference-plus-noise ratio).

Owing to the advantages of the multi-node system mentioned in the above description, in order to extend a service coverage and improve channel capacity and SINR as well as reduce a base station establishment cost and a maintenance cost of a backhaul network in a next generation mobile communication system, the multi-node system is used together with or substituted with the existing centralized antenna system, thereby emerging as a new base of a cellular communication.

DISCLOSURE OF THE INVENTION

Technical Task

The present invention relates to a channel state report of a user equipment, and more particularly, to a method or apparatus for a channel state report that reflects interference cancellation performance.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of reporting a channel state by a user equipment in a wireless communication system, including receiving a configuration of a zero power transmission resource for channel state measurement, the zero power transmission resource corresponding to a portion of CRS (cell-specific reference signal) REs (resource elements) of a serving base station or a portion of CRS REs of a dominant interference base station, determining whether the zero power transmission resource is configured in a subframe to which a reference resource for the channel state measurement belongs, if the zero power transmission resource is configured in the subframe, calculating either a first type or a second type of a channel state value in the zero power transmission resource, and reporting the calculated first type or second type of the channel state value to the serving base station, wherein the first type or the second type of the channel state value comprises a value from which an influence of an interference signal from the dominant interference base station is eliminated.

Additionally or alternatively, the first type of the channel state value may include a value from which the influence of the interference signal from the dominant interference base station is completely eliminated and the second type of the channel state value may include a value from which the influence of the interference signal from the dominant interference base station is partially eliminated.

Additionally or alternatively, the zero power transmission resource may be configured with a priority for a CRS port having a lower index of the serving station or the dominant interference base station.

Additionally or alternatively, the method may include if the zero power transmission resource is not configured in the subframe, calculating a third type of a channel state value in the zero power transmission resource and reporting the calculated third type of the channel state value to the serving base station. And, the value of the channel state of the third type may include a value from which the influence of the interference signal from the dominant interference base station is not eliminated at all.

Additionally or alternatively, the zero power transmission resource may include a portion of CRS RE located in a data region among the CRS REs of the serving base station or the CRS REs of the dominant interference base station in a subframe.

In another technical aspect of the present invention, provided herein is a user equipment for reporting a channel state in a wireless communication system, including a radio frequency (RF) unit and a processor configured to control the RF unit, wherein the processor is further configured to receive a configuration of a zero power transmission resource for channel state measurement, wherein the zero power transmission resource corresponds to a portion of CRS (cell-specific reference signal) REs (resource elements) of a serving base station or a portion of CRS REs of a dominant interference base station, determine whether the zero power transmission resource is configured in a subframe to which a reference resource for the channel state measurement belongs, if the zero power transmission resource is configured in the subframe, calculate either a first type or a second type of a channel state value in the zero power transmission resource, and report the calculated first type or second type of the channel state value to the serving base station, and wherein the first type or the second type of the channel state value comprises a value from which an influence of an interference signal from the dominant interference base station is eliminated.

Additionally or alternatively, the first type of the channel state value may include a value from which the influence of the interference signal from the dominant interference base station is completely eliminated and the second type of the channel state value may include a value from which the influence of the interference signal from the dominant interference base station is partially eliminated.

Additionally or alternatively, the zero power transmission resource may be configured with a priority for a CRS port having a lower index of the serving station or the dominant interference base station.

Additionally or alternatively, if the zero power transmission resource is not configured in the subframe, the processor may be configured to calculate a third type of a channel state value in the zero power transmission resource and report the calculated third type of the channel state value to the serving base station. And, the third type of the channel state value may include a value from which the influence of the interference signal from the dominant interference base station is not eliminated at all.

Additionally or alternatively, the zero power transmission resource may include a portion of CRS RE located in a data region among the CRS REs of the serving base station or the CRS REs of the dominant interference base station in a subframe.

The technical solutions just include embodiments of the present invention in part, and various embodiments reflecting the technical features of the present invention can be derived and understood by those skilled in the art, to which the corresponding technical field pertains, based on the detailed description of the present invention in the following.

ADVANTAGEOUS EFFECTS

According to one embodiment of the present invention, it is possible to make a channel state report that reflects interference cancellation performance, thereby expecting system performance improvement having the interference cancellation performance reflected therein.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
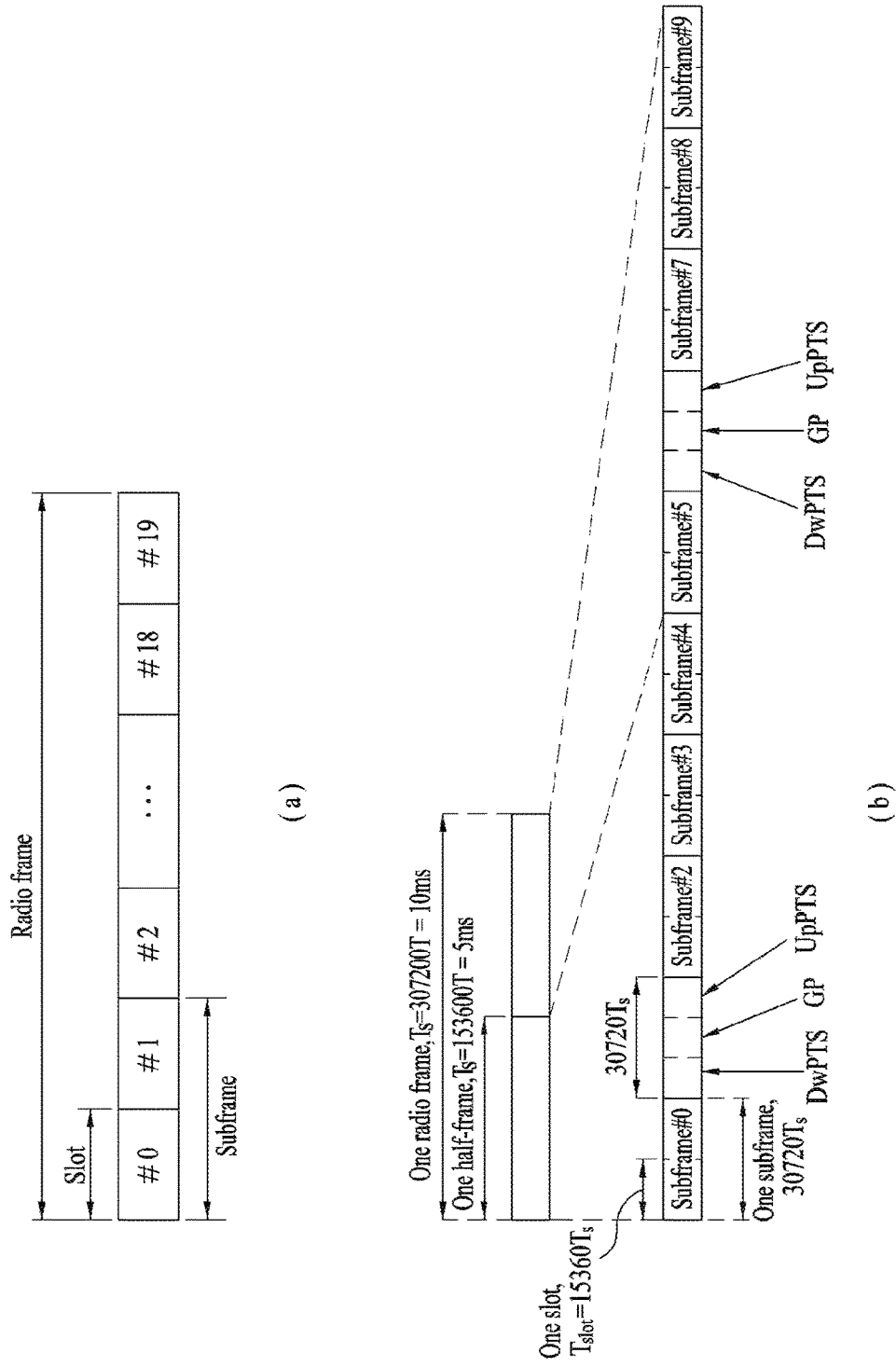
FIG. 1 shows one example of a radio frame structure used by a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
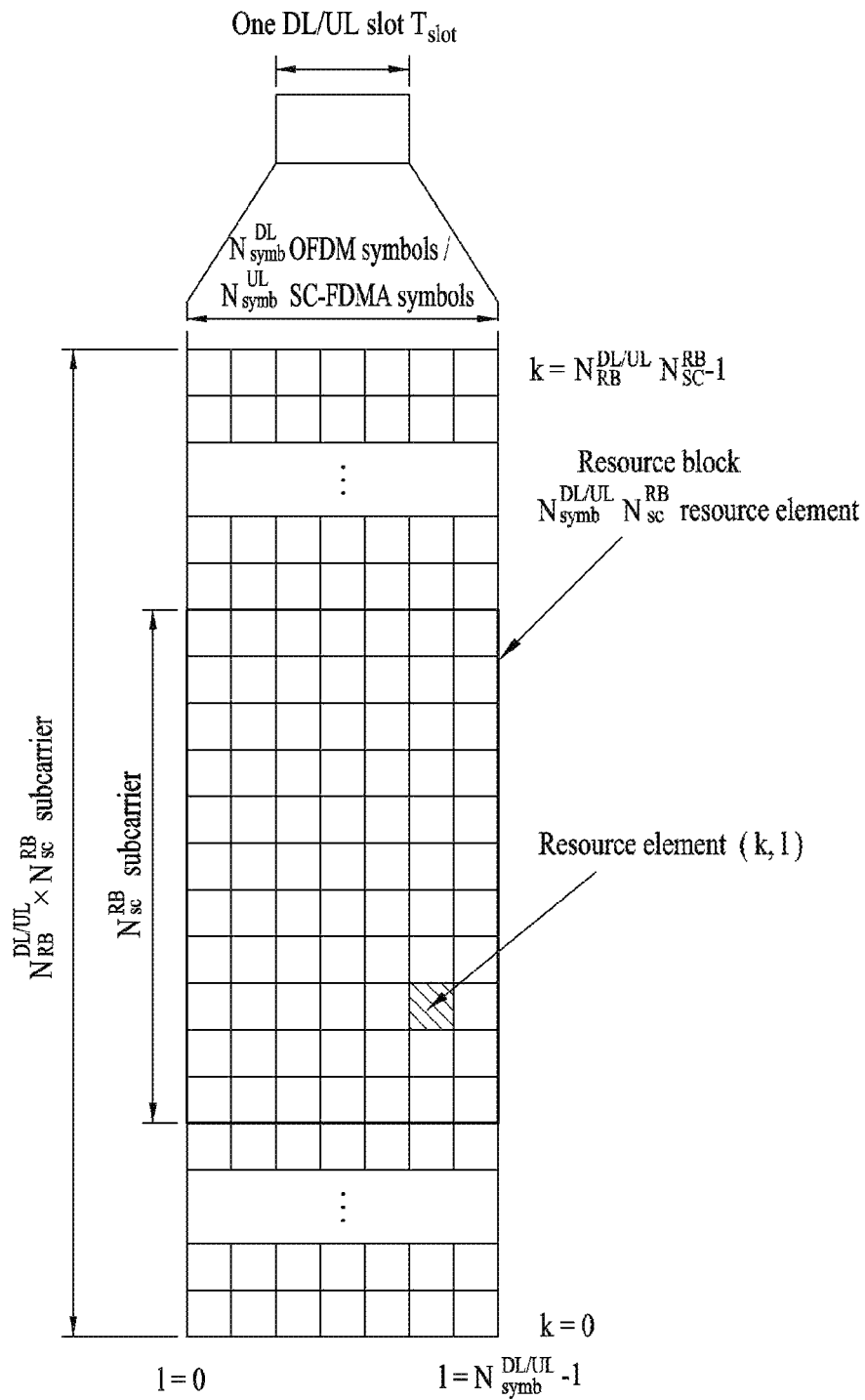
FIG. 2 shows one example of an uplink/downlink (UL/DL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
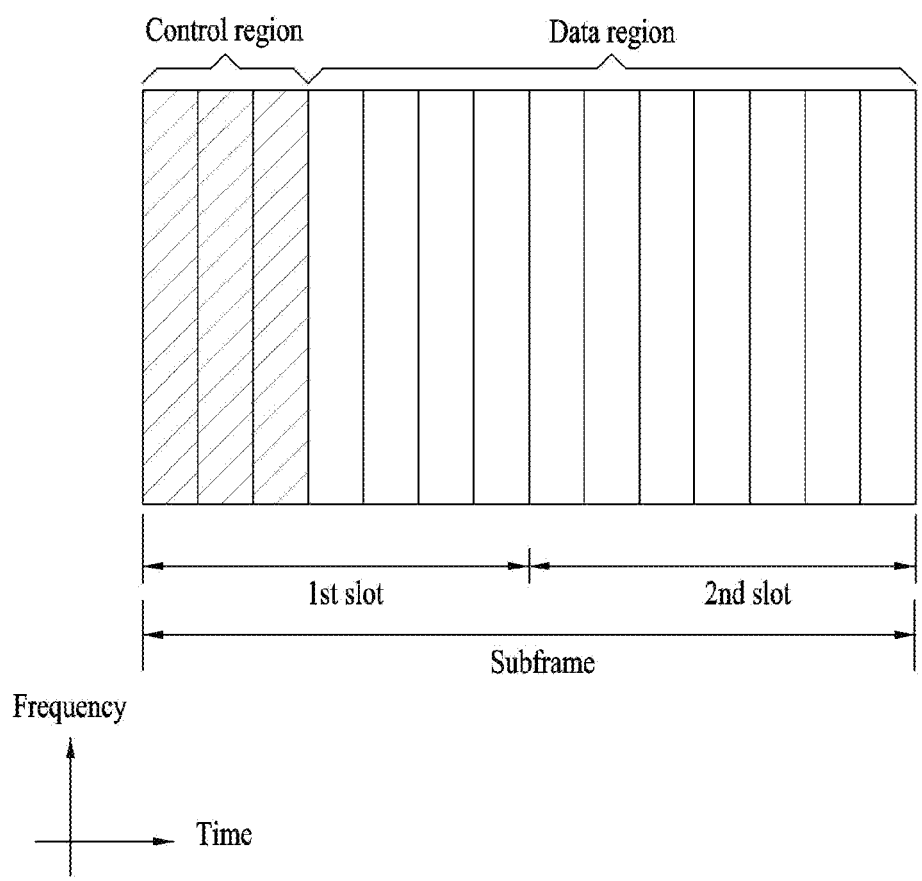
FIG. 3 shows one example of a downlink (DL) subframe structure used by 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
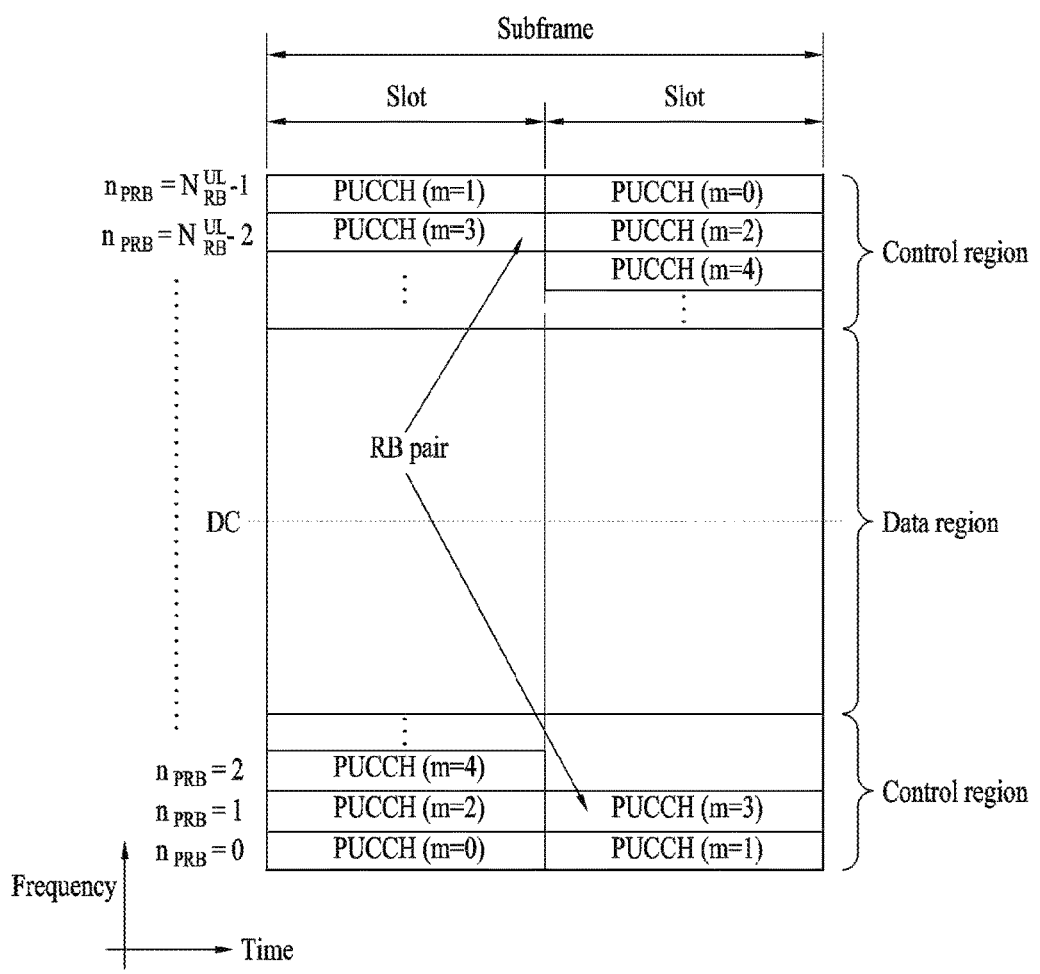
FIG. 4 shows one example of an uplink (UL) subframe structure used by 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

CSI-RS (Channel State Information-Reference Signal)

In 3GPP LTE(-A), the antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15, 16, p=15, ..., 18, and p=15, ..., 22), and CSI-RS may be defined only for $\Delta f=15$ kHz. The antenna ports (p=15, ..., 22) may correspond to CSI-RS ports (p= 0, ..., 7), respectively.

CSI-RS configuration may be varies according to the number of CSI-RS ports configured. There are 20 CSI-RS configurations if 2 CSI-RS ports are configured, there are 10 CSI-RS configurations if 4 CSI-RS ports are configured, and there are 5 CSI-RS configurations if 8 CSI-RS ports are configured. Numbers may be assigned to respective CSI-RS configurations defined by the number of CSI-RS ports.

The CSI-RS structures have nested property. The nested property may indicate that a CSI-RS structure for a large number of CSI-RS ports is used as a super set of a CSI-RS structure for a small number of CSI-RS ports. For example, REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type1 (SIB1) collides with CSI-RS. The UE assumes that no CSI-RS is transmitted in the above subframes. Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).

Number of CSI-RS ports
CSI-RS structure
CSI-RS subframe configuration $I_{CSI-RS}$
CSI-RS subframe configuration period $T_{CSI-RS}$
CSI-RS subframe offset $\Delta_{CSI-RS}$ If necessary, the BS (or eNB) may inform the UE of not only a CSI-RS configuration transmitted at zero power, but also a subframe used for transmission of the zero-power CSI-RS configuration.

CSI-IM (Interference Measurement)

For the 3GPP LTE Rel-11 UE, one or more CSI-IM resource structures may be configured. CSI-IM resource may be used to measure interference. The CSI-RS structure and the CSI-RS subframe structure (ICSI-RS) shown in FIG. 5 may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

In a multi-cell environment wireless communication system having a plurality of cells (e.g., a base station, eNB (evolved Node B) or TP (transmission point)) exist therein, NAICS (network assisted interference cancellation and suppression) scheme has been discussed recently as one of inter-cell interference mitigation schemes. For example, currently in LTE-A standardization, an SLIC (symbol-level interference cancellation) technology of removing a transmission signal of an adjacent cell in the symbol level in order to mitigate the effects of the downlink interference signal of the adjacent cell has been discussed. The UE can receive data at a high SINR by the canceled interference, which means that the UE can quickly receive data at a transmission rate improved than before.

In order for a UE to cancel interference and receive data at an improved transmission rate, a feedback calculation, in which an effect of cancelling interference in part or entirely is reflected, is required unlike an existing feedback calculation. If the UE feeds back a CQI (channel quality indicator) according to an existing calculating method without reflecting an effect of interference cancellation/mitigation, as such a feedback reports an excessively conservative (low) CQI, it may cause a result of failing to sufficiently obtain a gain of SLIC scheme. Hence, in order to obtain a gain using the SLIC scheme, it is important for the SLIC scheme supportive UE to calculate an interference-cancelled CQI and feed back the calculated CQI to a base station.

An example of a method for calculating a CQI, in which an effect of NAICS, i.e., an effect of interference cancellation is reflected, is shown in the following table. When a UE performs an SLIC operation of eliminating a transmitted signal of an adjacent cell considerably affecting the UE, a cell transmitting an interference signal having a biggest influence shall be named 'dominant interference cell'. A CQI having no influence of an interference signal from a dominant interference cell or a CQIU reflecting an NAICS effect on an interference signal from a dominant interference cell shall be named 'enhanced CQI'. If interference due to the dominant interference cell is not cancelled in part at least or does not exist at all, it can be called that the NAICS effect is reflected. In particular, the enhanced CQI corresponds to a value indicating a channel state that interference due to the dominant interference cell is cancelled in part at least or does not exist.

In calculating an enhanced CQI, a CQI, from which an interference signal effect from a dominant interference cell is completely eliminated or in which such an effect does not exist, shall be named 'clean CQI'. And, a CQI, in which a prescribed residual term remains despite eliminating the influence of the interference signal, shall be named 'partial-clean CQI'. Moreover, a CQI in which an effect of NAICS is not reflected shall be named 'conventional CQI'. A serving base station expects each UE to make a report by calculating an NAICS effect reflected CQI or an NAICS effect non-reflected CQI. And, a CSI-IM resource defined in LTE Standard shall be named 'IMR (interference measurement resource)'.

TABLE 5

| | | |
|---|---|---|
| clean CQI | IMR (interference measurement resource) configurable UE (e.g., TM 10 UE) | A serving cell and a dominant interference cell mute a signal on IMR RE, and a UE calculates CQI by measuring it. |
| | IMR non-configurable UE | If a serving cell and dominant interference cell correspond to colliding CRS, a UE calculates CQI by measuring an interference quantity after eliminating CRS from the serving cell and the dominant interference cell. |
| partial-clean CQI | IMR configurable UE (e.g., TM 10 UE) | A serving cell mutes a signal on IMR RE. If PDSCH of a dominant interference cell is transmitted on IMR RE, a UE calculates CQI in a manner of performing cancellation by performing BD on it and then measuring it. Alternatively, a serving cell and a dominant interference cell mute a signal on IMR RE, and a UE may calculate CQI after performing emulation by performing BD on PDSCH parameter of an interference cell on PDSCH RE except IMR RE. On the assumption that it is difficult to actually obtain CQI in a state that interference influence of the dominant interference cell is completely eliminated, such a method may be regarded as a further conservative CQI calculating method for obtaining an actually interference-cancelled channel state. |
| | IMR non-configurable UE | If a serving cell and dominant interference cell correspond to colliding CRS, after eliminating CRS from the serving cell and the dominant interference cell, a UE may performs emulation by performing BD on PDSCH parameter of an interference cell on PRSCH RE and then calculate CQI. |

In case of a TM 10 UE for which a plurality of CSI processes are configured, CQI can be calculated by matching a clean or partial-clean CQI shown in Table 5 to each CSI process. Alternatively, CQI may be calculated by matching a conventional CQI to a single CSI process. Alternatively, it may be able to make a report by calculating an enhanced CQI having a different interference condition reflected in each CSI process.

Yet, according to the current LTE standard, a single CSI process can be configured for UEs for which TM other than TM 10 is configured, and IMR (interference measurement resource) cannot be allocated to such UEs. Moreover, such UEs have difficult in using schemes for calculating the CQI, in which the interference cancellation effect mentioned in Table 5 is reflected, if a serving cell and a dominant interference cell correspond to non-colliding CRS. Hence, the present invention proposes the following method. First of all, in a multi-cell environment wireless communication system in which multiple cells (e.g., eNB (evolved Node B), TP (transmission point)) exist, when a specific UE is able to perform an NAICS operation of detecting and eliminating an adjacent cell interference signal with a help of a network, a base station applies a specific configuration to some REs to enable an interference measurement for an enhanced CQI calculation. Secondly, a corresponding UE calculates an NAICS effect reflected CQI by measuring interference from the corresponding RE. In the following description, detailed operations of the present invention are described by taking an LTE system as an embodiment. Furthermore, the following operations may be extensively applicable to a random wireless communication system including a UE having a high-performance receiver capable of interference cancellation.

Zero-Power CRS Configuration

Figure 5:
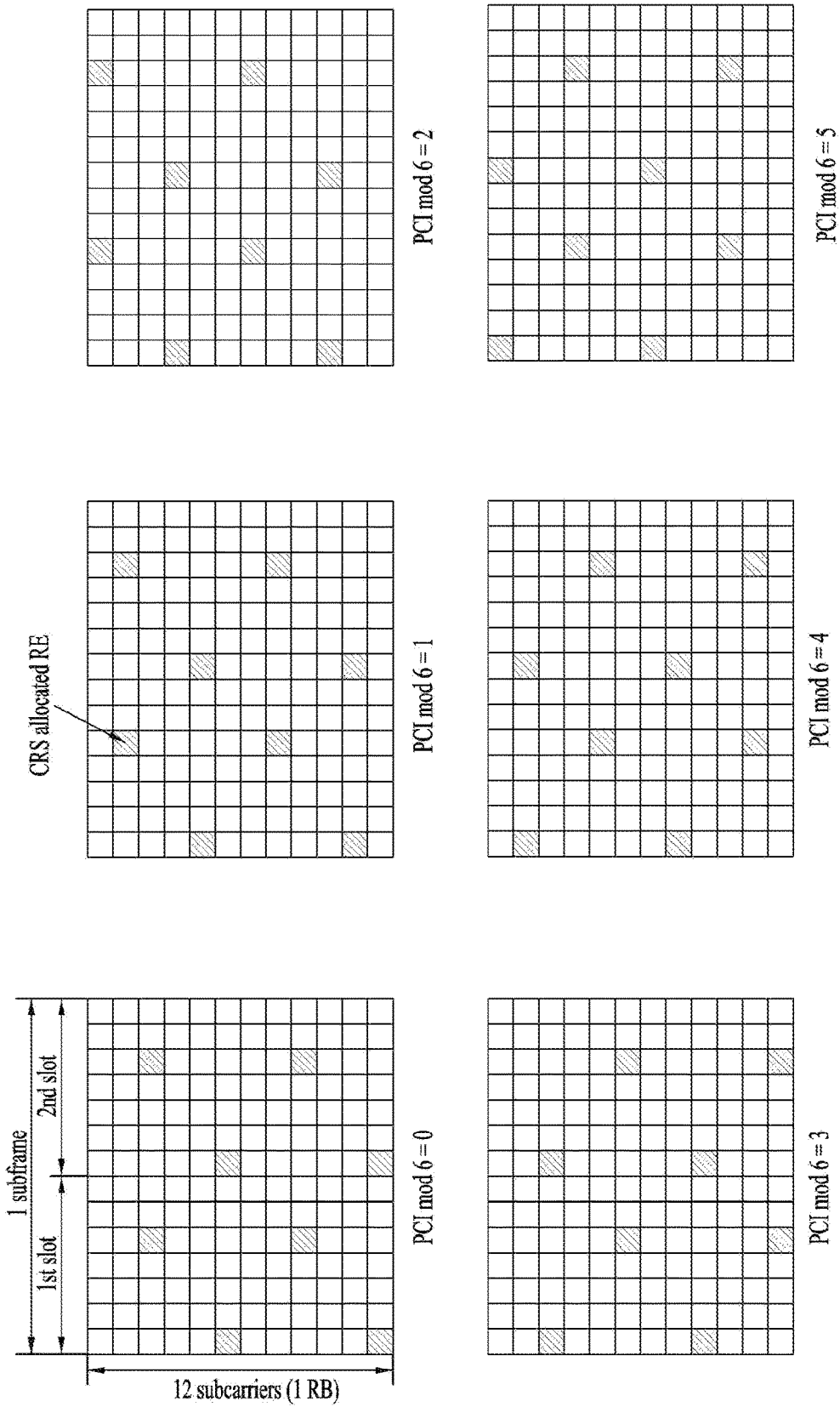
FIG. 5 shows mapping patterns of CRS RE.

According to the current LTE standard, CRS is designed in a manner that allocation of RE overlaps per 6 PCIs (physical cell identifiers). For instance, considering 1 CRS port, total 6 CRS RE mapping patterns according to PCI are available as shown in FIG. 5. In case that a value of (PCI mod 6 of serving cell) is not equal to a value of (PCI mod 6 of dominant interference cell), i.e., in case of a non-colliding CRS, although a UE of IMR non-configurable TM among UEs calculating an NAICS effect reflected CQI eliminates CRS of the serving cell from CRS RE, an interference PDSCH signal from the dominant interference cell remains. Hence, since the UE should perform blind detection (BD) on interference PDSCH parameters from the dominant interference cell in order to calculate an enhanced CQI, it has difficulty in calculating the enhanced CQI.

Therefore, the present invention proposes that a base station mutes a downlink signal instead of transmitting the downlink signal by configuring zero power for specific REs predesignated in a specific subframe. In particular, a cell corresponding to a dominant interference cell performs a zero-power transmission on a specific RE and a UE can calculate an NAICS effect reflected CQI by measuring interference on the specific RE. In doing so, the RE means an RE corresponding to a CRS RE of the dominant interference cell, and such a zero-power transmission configuration is named 'zero-power CRS configuration'. A zero-power CRS configuration of a serving cell of a UE corresponds to a configuration that the UE's dominant interference cell corresponding to a neighbor cell of the serving cell performs a zero-power transmission on a specific CRS RE of the serving cell.

Figure 6:
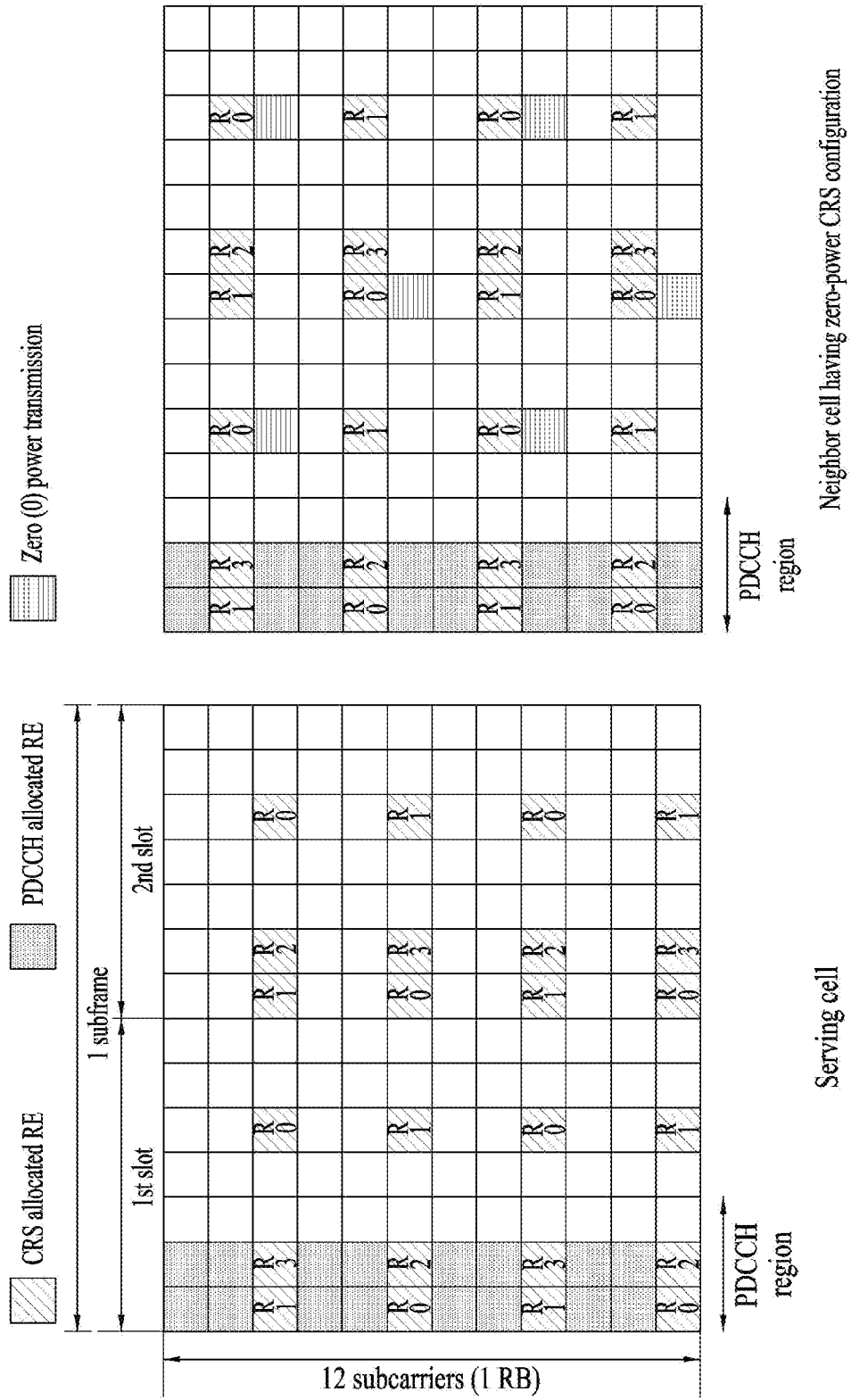
FIG. 6 shows resource configuration according to one embodiment of the present invention.

If a dominant interference cell configures a zero-power for an RE corresponding to a CRS RE of a serving cell, an IMR non-configurable UE of TM among UEs configured to calculate an NAICS effect reflected CQI can calculate an enhanced CQI without a particular signal processing on a signal of the dominant interference cell. According to a detailed embodiment, when a zero-power CRS configuration of a dominant interference cell is configured according to a right RE mapping pattern shown in FIG. 6, a UE can calculate an enhanced CQI by measuring interference after eliminating CRS of a serving cell from CRS RE of CRS port 0.

An IMR non-configurable UE of TM among UEs configured to calculate an NAICS effect reflected CQI preferably receives a help from a zero-power CRS configuration by calculating a CQI on CRS RE other than a control region. If a zero-power transmission is configured on CRS RE of a control region, since a transmission opportunity of a control region of a corresponding cell is lost, it is not appropriate. Hence, a serving base station of the UE configures a zero-power RE on CRS RE other than a control region only, and the UE expects that a zero-power transmission is configured for the CRS RE only other than the control region in calculating an enhanced CQI. Moreover, the UE measures interference on a zero-power CRS configuration applied RE of a dominant interference cell only and then uses it for enhanced CQI calculation.

A corresponding base station may additionally consider the following rules for a zero-power CRS configuration.

The base station punctures a zero-power RE in a zero-power CRS configured subframe and performs PDSCH RE mapping on the rest of RE only.

Since it is an operation for helping an enhanced CQI calculation of a UE of an IMR non-configurable TM, the base station selects and configures a zero-power RE within a CRS RE included OFDM symbol.

Since the CRS port number of each cell may differ, a zero-power RE is preferentially selected and configured within a CRS port 0 included OFDM symbol.

Namely, the CRS based interference measurement according to one embodiment of the present invention is performed on some of CRS REs in a prescribed subframe only, the rest of CRS REs are excluded from PDSCH RE mapping, and a configuration with a zero power for the corresponding CRS RE may be performed in a manner of giving priorities to CRS Res for a CRS port of a low index.

A UE is able to perform PDSCH decoding only if knowing PDSCH RE mapping within a resource region scheduled for the UE correctly. So to speak, a UE within a cell configuring a zero-power CRS requires information indicating that a zero-power transmission is configured for a prescribed RE. Hence, the zero-power CRS configuring cell informs UEs, which belong to the corresponding cell, of information on the zero-power CRS configuration using a semi-static signal. Or, the cell may inform the UEs of information on the zero-power CRS configuration using a dynamic signal. In particular, the information on the zero-power CRS configuration may include zero-power CRS configured subframe numbers, a zero-power CRS configured subframe periodicity, a zero-power CRS configured subframe offset, a zero-power CRS configured OFDM symbol number of a specific antenna, a frequency spacing, an offset or shift value of RE on a frequency axis, and the like.

Figure 7:
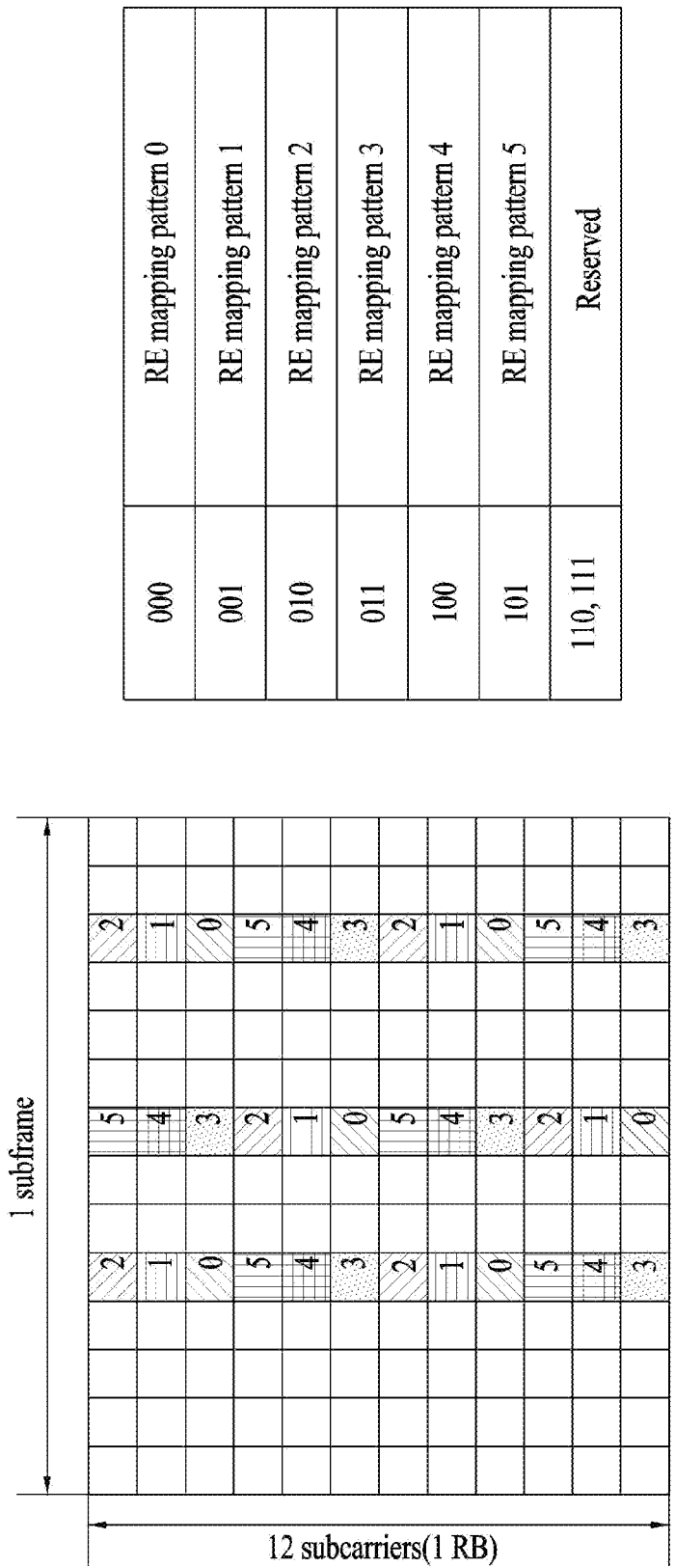
FIG. 7 shows a resource configuration pattern according to one embodiment of the present invention.

According to a detailed embodiment of the present invention, there are 6 kinds of mapping patterns of CRS RE corresponding to CRS port 0 except a control region for transmitting PDCCH in a single RB. Hence, as shown in FIG. 7, total 6 kinds of mapping patterns of RE transmitted with zero power are possible. And, a UE can be informed of the mapping pattern of RE transmitted with the zero power using 3 bits.

If a UE attempts to calculate an enhanced CQI using the zero-power CRS configuration of an adjacent cell, at least one portion of the following informations can be exchanged between a serving base station of the UE and a dominant interference base station.

Zero power transmission required RE mapping pattern: Namely, since a dominant interference base station should mute an RE corresponding to a CRS RE of a serving base station, information (e.g., PCI of the serving base station) on it is given to the dominant interference base station and the muting on the corresponding CRS RE can be requested. Or, since total 9 bits are required to indicate the PCI, in order to reduce signaling overhead, as shown in FIG. 7, the serving base station defines an RE mapping pattern in advance and is then able to transmit the corresponding 3 bits to the dominant interference cell only.

CRS portion information of serving base station: After CRS port information of the serving base station has been indicated, if a dominant interference base station performs the muting on a corresponding RE, more REs can be used for CQI calculation.

Periodicity/offset of zero-power CRS configuration: The serving base station can make a request for periodicity/offset of a subframe, for which zero-power CRS configuration will be set, to the dominant interference base station. Or, information on it may be notified to the serving base station by the dominant interference base station.

If a base station configures zero-power CRS on too many REs, it may cause transmission rate reduction. If a cell configures zero-power CRS in too many subframes, it may also cause transmission rate reduction. Hence, in order to minimize the transmission rate loss due to the zero-power CRS configuration, the following is proposed.

Only if the number of NAICS UEs indicating the same dominant interference cell in a cell is equal to or greater than a predetermined value, a serving cell makes a request for zero-power CRS configuration to the dominant interference cell.

Only if the number of NAICS UEs indicating the same dominant interference cell in a cell is equal to or greater than a predetermined value and a case that an RSRP (reference signal received power) for a dominant interference cell of the corresponding UEs exceeds a specific threshold is equal to or greater than a predetermined value, a serving cell makes a request for zero-power CRS configuration to the dominant interference cell.

If a subframe for which zero-power CRS is not configured is a subframe corresponding to a reference resource for CSI measurement, first of all, a UE determines whether a dominant interference cell is a colliding CRS with a service cell or a non-colliding CRS with the serving cell. In case of the non-colliding CRS, the UE calculates and report a conventional CQI without calculating an enhanced CQI. And, a base station expects that the conventional CQI will be reported with respect to a corresponding feedback.

Or, in order to prevent a case that a subframe for which zero-power CRS is not configured is a subframe corresponding to a reference resource for CSI measurement, the following can be added as validity conditions for the reference resource.

The reference resource should be a zero-power CRS configured subframe of a dominant interference cell. Otherwise, it cannot become the reference resource for the CSI measurement.

Or, if a subframe for which zero-power CRS is not configured is a subframe corresponding to the reference resource, a UE measures interference on CRS RE of a zero-power CRS configured serving cell of a dominant interference cell existing before or after the subframe, and may be able to estimate interference of the reference resource using it. In particular, the UE can still report an enhanced CQI despite that accuracy of the interference measurement may be lowered.

The zero-power CRS configuration can be operated in one of two manners as follows.

According to a first scheme, an interference cell configures CRS RE to mute (to transmit with zero-power) and then informs a serving cell's NAICS UE of it. In doing so, the zero-power CRS RE should exist as a subset of CRS RE of the serving cell. In order to measure interference power for CQI calculation, the NAICS UE performs elimination of CRS of the serving cell from the zero-power RE of the interference cell and is then able to measure interference on the corresponding RE.

According to a second scheme, a serving cell configures RE to mute (to transmit with zero-power) and then informs a UE of it. In doing so, the zero-power RE should exist as a subset of CRS RE of a dominant interference cell. In order to measure interference power for CQI calculation, the UE eliminates CRS of the interference cell from the zero-power RE of the serving cell and is then able to measure interference on the corresponding RE.

IMR Configuration for UE not in TM (Transmission Mode) 10

According to the current LTE standard, when a UE intends to calculate CSI, the UE measures a request channel and an interference channel toward itself, calculates CQI/RI/PMI with reference to the measured channels, and then reports the calculation result. Reference signals for channel part measurement include CRS and CSI-RS, and CRS and CSI-IM resource (or, IMR in general) exist for interference part measurement. In particular, in TMs 1 to 8, a channel part and an interference part are measured using CRS. In TM 9, a channel part is measured using CSI-RS and an interference part is measured using CRS. A UE configured in TM 10 measures a channel part using CSI-RS and also measures interference using CSI-IM.

As mentioned in the foregoing description, if a serving cell and a dominant interference cell correspond to a non-colliding CRS case, it may not be easy for a UE other than TM 10 to calculate and report a CQI having NAICS effect reflected therein. Particularly, as traffic of a dominant interference cell changes dynamically, if a relation between the dominant interference cell and the serving cell is dynamically switched between a colliding CRS case and a non-colliding CRS case, although a zero-power CRS is configured, a calculation of an enhanced CQI may get more difficult.

Hence, according to one embodiment of the present invention, it is proposed to configure IMR for a legacy UE (non-TM 10 UE) other than TM 10. A corresponding base station punctures IMRRE within an IMR configured subframe and is able to perform PDSCH RE mapping on the rest of Res.

If a UE configured in non-TM 10 receives a configuration of IMR, it is configured to measure interference on the corresponding IMR RE. And, the UE expects that PDSCH from a serving cell will not be transmitted on the IMR RE. With respect this, operations according to one embodiment of the present invention can be considered in a manner of being divided into two cases as follows.

A) Case That UE Directly Measures Interference on IMR RE

Through information on a dominant interference cell reported by a UE and a muting pattern of the cell, a serving station can determine whether the dominant interference cell is muting on an IMR RE allocated to the UE. The UE reports a CQI calculated by measuring interference on IMR. If the dominant interference cell is muting on the IMR RE, the serving station determines that the corresponding CQI is a clean CQI. If the dominant interference cell is not muting, the serving station determines that the corresponding CQI is a conventional CQI and is then able to use it for the scheduling of the UE.

B) Case that UE Makes a Report by Measuring Interference on IMR RE after Eliminating a Portion of an Interference Signal The UE performs blind detection on a dominant interference cell PDSCH on IMR RE, eliminates the dominant interference cell PDSCH using it, and is then able to report a CQI calculated by measuring interference to a serving base station.

If the dominant interference cell is not muting on the IMR RE, the serving station determines that the CQI is a partial-clean CQI and utilizes it for the scheduling of the UE. If the dominant interference cell is muting, since such elimination is not appropriate, the serving station discards the CQI instead of using it.

The serving base station informs a UE, which is configured in non-TM 10, of IMR configuration related information such as IMR configured subframe numbers, periodicity/subframe offset, IMR configured OFDM symbol number of specific antenna, frequency spacing, an offset or shift value of RE on frequency axis and the like using a semi-static signal. In configuring IMR, when a UE measures interference, if necessary, the serving base station may indicate whether the interference will be measured on IMR RE directly or after attempting to eliminate an interference signal.

As a modification of the above-mentioned embodiment, it is proposed that a serving base station designates an interference measurement capable RE in ZP (zero power) CSI-RS resource configuration to a UE configured in non-TM 10. For detailed example, it is designated that a prescribed one of 10 kinds of RE mapping patterns of ZP CSI-RS resource corresponds to ZP CSI-RS. And, which one of the patterns corresponding to ZP CSI-RS is an RE mapping pattern to be used for interference measurement can be designated as well. Hence, the UE configured in non-TM 10 can measure interference on the ZP CSI-RS RE designated to measure interference.

Figure 8:
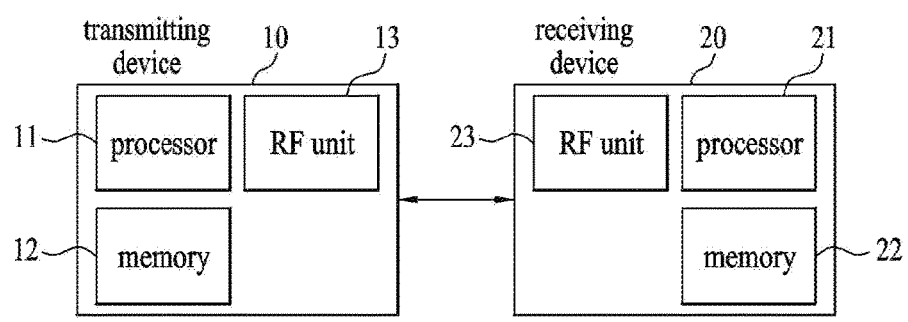
FIG. 8 is a block diagram of a device for implementing embodiment(s) of the present invention.

FIG. 8 is a block diagram of a transmitting device 10 and a receiving device 20 configured to implement exemplary embodiments of the present invention. Referring to FIG. 8, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and an eNB.

What is claimed is:

1. A method of reporting a channel state by a user equipment (UE) which is not capable of being configured with a channel state information-interference measurement (CSI-IM) resource consisting of a zero power CSI-reference signal (CSI-RS) resource in a wireless communication system, the method comprising:
   receiving a configuration of a zero power cell-specific reference signal (CRS) resource for channel state measurement, the zero power CRS resource corresponding to a portion of CRS resource elements (REs) of a serving base station or a portion of CRS REs of a dominant interference base station;
   determining whether the zero power CRS resource is configured in a subframe to which a reference resource for the channel state measurement belongs;
   when the zero power CRS resource is determined to be configured in the subframe, calculating either a first type or a second type of a channel state value in the zero power CRS resource; and
   reporting the calculated first type or the calculated second type of the channel state value to the serving base station,
   wherein the calculated first type or the calculated second type of the channel state value comprises a value from which an influence of an interference signal from the dominant interference base station is eliminated.

2. The method of claim 1, wherein the calculated first type of the channel state value comprises a value from which the influence of the interference signal from the dominant interference base station is completely eliminated, and
   wherein the calculated second type of the channel state value comprises a value from which the influence of the interference signal from the dominant interference base station is partially eliminated.

3. The method of claim 1, wherein the zero power CRS resource is configured with a higher priority for a CRS port having a lower index of the serving station or the dominant interference base station.

4. The method of claim 1, further comprising:
   when the zero power CRS resource is not configured in the subframe, calculating either the first type or the second type of the channel state value using an interference value which is measured in a zero power CRS resource in another subframe.

5. The method of claim 1, wherein the zero power CRS resource corresponds to a portion of CRS REs located in a data region among the CRS REs of the serving base station or the CRS REs of the dominant interference base station in a subframe.

6. A user equipment (UE) for reporting a channel state in a wireless communication system, wherein the UE is not capable of being configured with a channel state information-interference measurement (CSI-IM) resource consisting of a zero power CSI-reference signal (CSI-RS) resource, the UE comprising:
   a receiver;
   a transmitter; and
   a processor that:
      controls the receiver to receive a configuration of a zero power cell-specific reference signal (CRS) resource for channel state measurement,
      wherein the zero power CRS resource corresponds to a portion of CRS resource elements (REs) of a serving base station or a portion of CRS REs of a dominant interference base station,
      determines whether the zero power CRS resource is configured in a subframe to which a reference resource for the channel state measurement belongs,
      when the zero power CRS resource is determined to be configured in the subframe, calculates either a first type or a second type of a channel state value in the zero power CRS resource, and
      controls the transmitter to report the calculated first type or the calculated second type of the channel state value to the serving base station,
      wherein the calculated first type or the calculated second type of the channel state value comprises a value from which an influence of an interference signal from the dominant interference base station is eliminated.

7. The UE of claim 6, wherein the calculated first type of the channel state value comprises a value from which the influence of the interference signal from the dominant interference base station is completely eliminated, and
   wherein the calculated second type of the channel state value comprises a value from which the influence of the interference signal from the dominant interference base station is partially eliminated.

8. The UE of claim 6, wherein the zero power CRS resource is configured with a higher priority for a CRS port having a lower index of the serving station or the dominant interference base station.

9. The UE of claim 6, wherein when the zero power CRS resource is not configured in the subframe, the processor calculates either the first type or the second type of the channel state value using an interference value which is measured in a zero power CRS resource in another subframe.

10. The UE of claim 6, wherein the zero power CRS resource corresponds to a portion of CRS REs located in a data region among the CRS REs of the serving base station or the CRS REs of the dominant interference base station in a subframe.

11. The method of claim 1, wherein the configuration of the zero power CRS resource is received when at least one of:
- a number of UEs indicating the dominant interference base station is equal to or larger than a predetermined value, or
- a reference signal received power (RSRP) for the dominant interference base station is larger than a threshold value.

12. The UE of claim 6, wherein the configuration of the zero power CRS resource is received when at least one of:
- a number of UEs indicating the dominant interference base station is equal to or larger than a predetermined value, or
- a reference signal received power (RSRP) for the dominant interference base station is larger than a threshold value.

* * * * *